(Model.)
W. BOUGHTON.
VEHICLE POLE.
No. 260,275. Patented June 27, 1882.
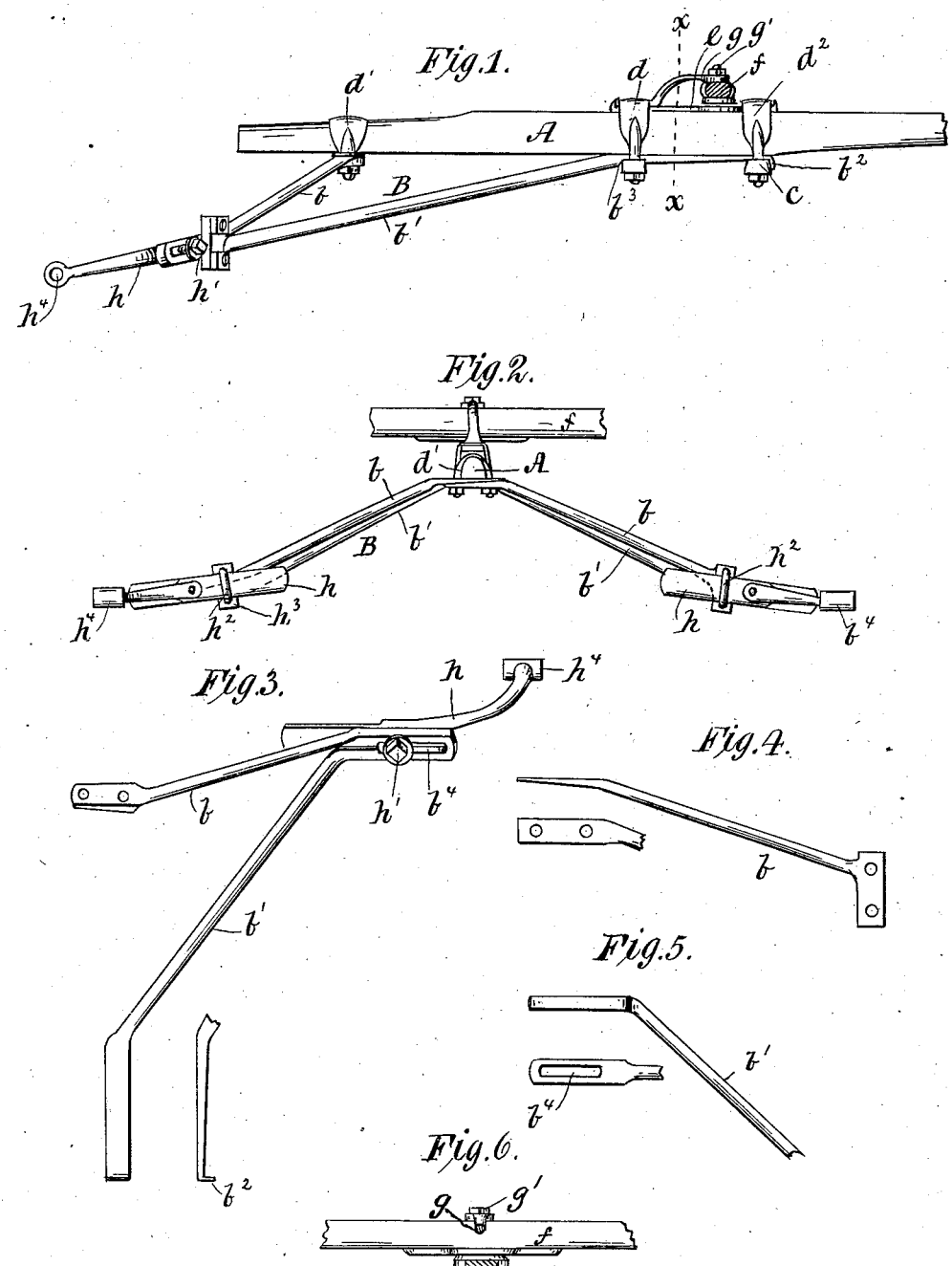
WITNESSES
P. B. Turpin
Geo. A. Diggs
INVENTOR
William Boughton
By R. S. and A. P. Lacey
ATTORNEY'S
N. PETERS, Photo-Lithographer, Washington, D. C.

UNITED STATES PATENT OFFICE.

WILLIAM BOUGHTON, OF CALEDONIA, OHIO.

VEHICLE-POLE.

SPECIFICATION forming part of Letters Patent No. 260,275, dated June 27, 1882.

Application filed April 27, 1882. (Model.)

*To all whom it may concern:*

Be it known that I, WILLIAM BOUGHTON, a citizen of the United States, residing at Caledonia, in the county of Marion and State of Ohio, have invented certain new and useful Improvements in Vehicle-Poles, of which the following is a specification, reference being had therein to the accompanying drawings.

My invention relates to improvements in vehicle-poles; and it has for its object to so construct the hounds that a straight pole may be employed and still be elevated to the proper height, and also to connect the pole to the hounds in such manner that the pole may be adjusted forward or back to adapt it to the length of the team; also, to so couple the thill-irons to the hounds that the eyes of irons may be adjusted to adapt the hounds to wide or narrow wagon, as may be used, all of which will be hereinafter fully described, and pointed out in the claims.

In the drawings, Figure 1 is a side view, Fig. 2 a rear view, and Figs. 3, 4, and 5 are detail views, of parts of a vehicle-tongue constructed according to my invention; and Fig. 6 is a cross-section on line $x\ x$, Fig. 1.

A is the pole, straight, as shown.

B represents the hounds composed of the front and rear rods, $b'\ b$, connected together at their outer ends, as will be described. The rods $b'$ are carried forward and inclined upward and inward and meet under the pole, as shown, and their forward portions, from the meeting-point, are flattened and extended forward in a horizontal line, with their extremities bent slightly downward, forming a hook, $b^2$, providing a secure hold for the bar $c$, extended across under the tongue, as will be hereinafter described. The forward portions of the arms $b'$, on either side, are constructed alike, and they together are just the width of the under side of the pole, as shown in Fig. 6. The juncture of the flattened and main portion of the rods $b'$ is rather abrupt and forms a shoulder, $b^3$, which serves as a stop for the clip $d$, passed around the pole and rods, as will be described. The rods $b$ are shorter than rods $b'$, and are inclined forward from their point of connection with rods $b'$ and bent upward at a greater angle than the said rods to a point directly in rear and in same plane with the forward ends of rods $b'$, and their inner ends are flattened and beveled, as shown at Fig. 2, so that when they are brought together, one under the other, under the pole they form substantially a bar having its upper and lower faces parallel, and they are secured to the pole by the clip $d'$, as shown.

$e$ is a bar made of a length corresponding to the length of the flattened portion of rods $b'$. It is placed on the top of the pole, immediately over the flattened portion of rods $b'$, and its front and rear ends are turned up, providing means for keeping in proper relative positions the clips $d\ d^2$ and double-tree $f$ when the nuts on said clips are loosened to permit the forward or back adjustment of the pole, as will be described.

$g$ is the clevis, to which I secure the double-tree by bolt $g'$, as shown. This clevis is extended from over the double-tree downward and rearward under arch of clip $d$, and its rear end is bent slightly upward, forming a hook which engages with clip $d$ and secures the clevis in position. The bolt $g'$ bears in a threaded mortise through plate $e$, and when so desired may be turned down tight against the pole. Ordinarily this bolt is clear of the pole, and the latter is held only by the three clips, as will be described.

I have shown on each side a different mode of connecting the rods at their outer ends. On one side I have employed the construction shown in Fig. 3 and in dotted line on the left in Fig. 2—that is, having the outer end of rod $b'$ flattened and bent back against itself and then continued on, forming the rod $b$, thus making the rods $b\ b'$ in one piece.

Between the portions turned one against the other I cut the slot $b^4$, through which is passed the bolt $h'$, securing the thill-iron $h$.

Around the iron $h$ and the rods $b$, I pass the clip $h^2$, the cross-bar $h^3$ of said clip bearing against rods $b\ b'$ at about the point of their separation. On the opposite side of the tongue I make the rods $b\ b'$ separate, constructing the outer end of rod $b$ as shown in Fig. 4 and dotted lines, Fig. 2—that is, turning it to make the cross-bar $i$ of the clip $h^2$. On this side I flatten the outer end of rod $b'$, as shown in Fig. 5, and cut the slot $b^4$ through it.

$h\ h$ are the thill-irons formed with the eye $h^4$, and having a bolt-hole about midway their length to receive the bolt $h'$. They are secured to the hounds by the bolt $h'$ and clips $h^2$, as shown, furnishing a rigid connection between the hounds and the irons.

By the construction shown it will be seen that the pole is only secured to the hounds by clips $d\ d'\ d^2$, and when it is desired to make the pole longer or shorter to suit the length of the team this may be accomplished by loosening the clips $d\ d'\ d^2$ and setting the pole at any length desired.

By loosening the clips $h^2$ and bolts $h'$ the irons may be adjusted out or in to adapt them to wide or narrow wagon or to the different location of the clips on the axle.

By the construction shown and described it will be seen that I have constructed the forward rods of the hounds so they may be secured to the pole by clips without making any holes through them, and that no holes are formed through the pole; also, that by the arrangement of the hounds a straight pole is used and still elevated properly, and that the pole and hounds are connected by the clips alone, so that by loosening the said clips the pole may be readily adjusted forward or back, as desired.

Having thus described my invention, what I claim, and desire to secure by Letters Patent, is—

1. In a vehicle-pole, the hounds B, composed of the rods $b'$, extended forward and inclined inward and upward, and having their inner ends secured under the pole, and rods $b$, made shorter than rods $b'$, and connected at their outer ends to the latter, and extended upward and inward at a greater angle than the rods $b'$, and secured at their inner ends to the pole in a line directly in rear of and in the same plane with the point of connection of rods $b'$ and the pole, substantially as described.

2. The combination, substantially as described, of the pole A, the hounds B, and the clips $d\ d'\ d^2$, the hounds being secured to the pole by the clips alone, as and for the purposes set forth.

3. The combination, substantially as described, of the pole A, bar $e$, double-tree $f$, bolt $g'$, clevis $g$, and clips $d\ d^2$, as set forth.

4. The combination of the rods $b'$, having their forward portions flattened, and constructed with the hook $b^2$ and shoulder $b^3$, the bar $e$, made equal length with the flattened portion of rods $b'$, and having its ends turned up, as shown, and adapted to support the clevis $g$ and double-tree $f$, the clips $d\ d^2$, and pole A, substantially as and for the purposes set forth.

5. The combination, substantially as set forth, of the hounds B, constructed with the slot $b^4$, the thill-iron $h$, provided with eye $h^4$, the clamping-bolt $h'$, and clip $h^2$, as set forth.

In testimony whereof I affix my signature in presence of two witnesses.

WILLIAM BOUGHTON.

Witnesses:
 GEORGE W. LOWE,
 J. BLANCHARD.